United States Patent [19]
Cohnen et al.

[11] 3,892,889
[45] July 1, 1975

[54] PROCESS FOR STABILIZING MOLDINGS OF HIGH MOLECULAR WEIGHT THERMO-PLASTIC POLYCARBONATES

[75] Inventors: Wolfgang Cohnen; Günter Peilstöcker, both of Krefeld, Germany

[73] Assignee: Bayer Aktiengesellschaft, Leverkusen, Germany

[22] Filed: Feb. 28, 1973

[21] Appl. No.: 336,657

[30] Foreign Application Priority Data
Mar. 10, 1972  Germany............................ 2211641

[52] U.S. Cl............................427/160; 252/300; 260/45.8 N; 260/45.85; 260/45.95
[51] Int. Cl........................ C08g 51/58; C08g 51/60
[58] Field of Search......... 117/33.3, 138.5, 138.8 B, 117/138.8 F; 252/300; 260/45.8, 45.85, 45.7, 45.95, 47

[56] References Cited
UNITED STATES PATENTS

| | | | |
|---|---|---|---|
| 2,976,259 | 3/1961 | Hardy et al. | 260/45.95 |
| 3,043,709 | 7/1962 | Amborski | 117/7 |
| 3,298,959 | 1/1967 | Marks et al. | 252/300 |
| 3,309,219 | 3/1967 | Etherington | 117/33.3 |
| 3,309,220 | 3/1967 | Osteen | 117/33.3 |
| 3,519,462 | 7/1970 | Bristol et al. | 117/33.3 |
| 3,617,330 | 11/1971 | Peilstocker | 117/33.3 |

FOREIGN PATENTS OR APPLICATIONS
1,024,342  3/1966  United Kingdom

*Primary Examiner*—P. E. Willis, Jr.
*Attorney, Agent, or Firm*—Lawrence S. Pope

[57] ABSTRACT

Articles of high molecular weight thermoplastic polycarbonates having high resistance to ultraviolet radiation while retaining good mechanical properties prepared by applying to the surface of the articles a liquid mixture containing 2 – 20 percent by weight of an ultraviolet absorber in a mixture of 10 to 80 parts by weight of one or more aliphatic $C_1 - C_3$ halogenohydrocarbons, 20 to 80 parts by weight of one or more lower aliphatic $C_1 - C_4$ alcohols, which may be halogen-substituted, and 0 to 25 parts by weight of water. The mixtures are applied to the polycarbonate at room temperature and subsequently dried at 70° – 100°C.

13 Claims, No Drawings

PROCESS FOR STABILIZING MOLDINGS OF HIGH MOLECULAR WEIGHT THERMO-PLASTIC POLYCARBONATES

BACKGROUND OF THE INVENTION

This invention relates to ultraviolet radiation stabilizers for thermoplastics and more specifically to ultraviolet radiation stabilizers and processes for applying the same to articles of high molecular weight thermoplastic polycarbonates.

Thermoplastic polycarbonates based on aromatic bis-hydroxy compounds, while capable of absorbing UV rays to a high extent, are themselves damaged by such rays.

Various methods have been developed to increase the resistance of these polycarbonates to damage caused by the absorption of UV rays. These methods, although causing a relative improvement in the UV stability of polycarbonates, have various drawbacks that make them undesirable.

Thus, according to DP No. 1,194,142 (U.S. Pat. No. 3,322,719), the incorporation of suitable UV absorbers, for example certain benzophenone and benzotriazole derivatives, into polycarbonates which have previously been rendered slightly acidic, only yields moldings which can be exposed to UV rays and moisture and elevated temperatures simultaneously, which exposure is required for applications of the polycarbonate such as modern street lighting sources, if very high concentrations of UV absorber are incorporated into the polycarbonates. This cannot be achieved, however, without simultaneous damage to the plastic in other respects such as, for example, in reductions in the impact strength and heat distortion point.

The processes according to DOS No. 1,694,137 and DOS No. 1,800,277 (U.S. Pat. No. 3,617,330) are disadvantageous inasmuch as the moldings treated with the UV absorber solutions described therein require heating needed for complete evaporation of the solvents or solvent mixtures used. Such heating of the moldings, which as a rule starts at a temperature of about 70°C and in the course of which the temperature must slowly be raised to 130°C and subsequently be maintained for about 30 minutes at 130°C, causes the appearance of bubbles in the moldings, especially in moldings with a structured surface, and thus causes a lowering of the optical quality of the moldings and a lowering of the mechanical strengths, especially of the impact strength of the moldings.

If, on the other hand, moldings of polycarbonates are treated, according to British Pat. No. 1,029,335 or French Pat. No. 1,432,044 (U.S. Pat. No. 3,309,220), with dispersions or solutions containing UV absorbers, towards which the polycarbonate moldings are inert, (compare British Pat. No. 1,029,335, page 4, lines 66 – 70), the resultant polycarbonate moldings do not have great resistance to simultaneous exposure to UV rays, moisture and elevated temperature because their surface becomes significantly porous rapidly.

SUMMARY OF THE INVENTION

It has now been found, in accordance with this invention, that moldings of high molecular weight thermoplastic polycarbonate can be stabilized against simultaneous exposure to light, heat and moisture by a process which is characterized in that the moldings of high molecular weight thermoplastic polycarbonate are treated with liquid mixtures containing UV absorbers; the liquid mixtures consisting of 10 to 80 parts by weight of one or more aliphatic $C_1$–$C_3$ halogenohydrocarbons, 20 to 80 parts by weight of one or more lower aliphatic, optionally halogen-substituted, $C_1$–$C_4$ alcohols and 0 to 25 parts by weight of water at room temperature. The treated moldings are subsequently dried at between 70° and 100°C.

The polycarbonate moldings obtained according to the process of the invention have practically completely continuous surfaces and contain the UV absorber to a depth of about 30 $\mu$, generally to about 25 $\mu$, in amounts of between 2 g and 30 g, generally between 6 g and 20 g, per m² of surface area; they are, as a result, not only protected against damage by intense and long-lasting irradiation but can also be exposed to such irradiation with simultaneous long-lasting exposure to moisture at temperatures of up to about 140°C, without yellowing and loss of impact strength and surface gloss.

DETAILED DESCRIPTION

High molecular weight thermoplastic polycarbonates of bis-hydroxy compounds in the sense of the invention are the polycarbonates which may be manufactured from dihydric phenols such as resorcinol and hydroquinone, from dihydroxydiphenylene and especially from bis-(hydroxyphenyl)-alkanes, such as for example, bis-(4-hydroxyphenyl)-propane-2,2 (bisphenol A) of bis-(4-hydroxy-3,5-dimethylphenyl)-propane-2,2, from trinuclear bisphenols such as $\alpha,\alpha'$-bis-(4-hydroxyphenyl)-p-diisopropylbenzene, from halogenated bis-(hydroxyphenyl)-alkanes such as, for example, 4,4'-dihydroxy-3,5,3',5'-tetrachlorodiphenyl-propane-2,2 or 4,4'-dihydroxy-3,5,3',5'-tetrabromodiphenyl-propane-2,2, bis-(hydroxyphenyl)-cycloalkanes, -sulphones, -sulphoxides, -ethers or -sulphides, optionally mixed with glycols, with derivatives of carbonic acid, for example its diesters or dihalides, optionally with conjoint use of minor amounts of dicarboxylic acids or their derivatives suitable for ester formation, and which possess an average molecular weight of at least about 10,000 and preferably of between about 25,000 and about 200,000. Any of the polycarbonates described in "Chemistry and Physics of Polycarbonates" by Herman Schnell, Interscience Publishers (1964) and in "Polycarbonates" by William F. Christopher and Daniel W. Fox, Reinhold Publishing Corporation (1962) and in U.S. Pat. No. 3,028,365 may be used in the practice of this invention.

Examples of UV absorbers suitable for the process are benzophenone derivatives such as 2-hydroxy-4-methoxy-benzophenone, 2,4-dihydroxy-benzophenone, 2,2'-dihydroxy-4-methoxy-benzophenone, 2-hydroxy-4n-octoxy-benzophenone, 2,2'-dihydroxy-4,4'-dimethoxybenzophenone and 2-hydroxy-4-methoxy-4'-methyl-benzophenone, benzotriazole derivatives such as 2-(2'-hydroxy-5'-methylphenyl)benzotriazole, 2-(2'-hydroxy-5'-tert.-butylphenyl)-benzotriazole, 2-(2'-hydroxy-3'-methyl-5'-tert.-butyl-phenyl)-benzotriazole, 2-(2'-hydroxy-5'-cyclohexylphenyl)-benzotriazole, 2-(2'-hydroxy-3'5'-dimethylphenyl)-benzotriazole, 2-(2'-hydroxy-5'-tert.-butylphenyl)-5-chlorobenzotriazole and 2-(2'-hydroxy-3',5'-di-tert.-butylphenyl)-benzotriazole, as well as derivatives of crotonic acid or acrylic acid such as $\alpha$-cyano-$\beta$-methyl-$\beta$-(p-methoxyphenyl)-crotonic acid methyl ester or α-cyano-β-N-(2-methyl-indolinyl)-acrylic acid methyl ester.

The Examples of UV absorbers of the benzophenone type may be summarized by the following formula A

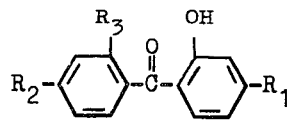

wherein
R₁ is —H, —OH, —O—CH₃ or —O—(CH₂)₇—CH₃,
R₂ is —H, —O—CH₃ or CH₃ and
R₃ is —H or —OH.

The Examples of the UV-absorbers of the benzotriazole type may be summarized by the follwing formula B

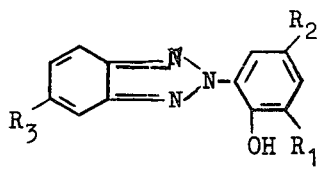

wherein
R₁ is H, 13 CH₃, —C(CH₃)₃ or —(CH₂)₄—CH₃,
R₂ is H, —CH₃, —C(CH₃)₃, —(CH₂)₄—CH₃ or cyclohexyl and
R₃ is H or Cl.

It is to be understood that the invention is applicable to any ultraviolet absorber and that any one or combination of absorbers may be used in accordance with this invention.

$C_1$–$C_3$ halogenohydrocarbons or their mixtures are suitable for the process according to the invention. As examples, there may be mentioned chlorohydrocarbons dichloromethane, trichloromethane, 1,2-dichloroethane, 1,2-dichloropropane and 1,1,2-trichloroethane and mixtures of these halogenohydrocarbons.

Examples of aliphatic, optionally halogen-substituted, $C_1$–$C_4$ alcohols or their mixtures which are suitable for the process are: methanol, ethanol, n-propanol, iso-propanol, iso-butanol, 2-chloroethanol and 2-chloropropanol and mixtures of these alcohols.

The liquid mixtures according to the invention should contain, in solution, one or more of the UV absorbers mentioned, in amounts totalling 2 percent by weight to 20 percent by weight, preferably 2.5 – 10 percent by weight, based on the weight of the liquid mixtures.

The treatment, according to the invention, of the polycarbonate moldings with the UV absorber solutions is as a rule carried out at room temperature.

One embodiment of the process according to the invention consists, for example, of immersing polycarbonate moldings for about 5–60 seconds, at room temperature, in one of the liquid compositions according to the invention for example a liquid composition comprising 10 – 80 parts by weight of 1,2-dichloroethane and/or 1,2-dichloropropane and/or 1,1,2-trichloroethane, 20 – 80 parts by weight of ethanol and/or n-propanol, and/or isopropanol, isobutanol and/or 2-chloroethanol and 0–25 parts by weight of water, containing 2.5 percent by weight of one or more UV absorbers in solution, allowing the excess liquid mixture to drip off and thereafter drying the moldings at temperatures of between 70° and 100°C, preferably between 90° and 95°C.

The treatment, according to the invention, of the surfaces of the polycarbonate moldings with UV absorber solution can also be effected by other methods such as pouring, spraying or roller application. If spraying is used, the liquid mixture containing the UV absorber should be applied in an amount of from about 150 to about 300 cc per square meter of the molding surface. The consumption of the mixture is made up of the part that adheres to the surface, the draining loss, the loss through spraying beyond the edges and the solvent loss resulting from evaporation of the spray mist. When the moldings are made by these methods, they will have practically continuous surfaces and will contain the UV absorber in amounts of between about 2 g and 30 g, and generally between 6 g and 20 g, per m² of surface area.

Annealing, which is in itself known, of the moldings before the treatment according to the invention is advisable in the case of those moldings in which strong internal strains are present, originating from their manufacture.

It is also possible for moldings of polycarbonate, which is already stabilized by UV absorbers, for example polycarbonate stabilized according to DP No. 1,194,142 (U.S. Pat. No. 3,322,719) to be additionally stabilized by the process according to the invention especially against intense and long-lasting UV irradiation.

Polycarbonate moldings with surfaces improved in accordance with the process of the invention can subsequently be thermoformed according to known methods, for example by the press-molding, deep-drawing and draping processes.

The polycarbonate moldings obtainable according to the invention are particularly suitable for use where extreme climatic factors are to be expected such as, for example, for covering strong light sources of high UV ray emission such as modern street lighting sources, where absence of color, optical clarity, prismatic surface structure and low absorption for optical rays in the visible wavelength range, on the one hand, and high impact strength and therefore virtual unbreakability, on the other, are required.

Such moldings of thermoplastic polycarbonates stabilized against the simultaneous action of light, heat and moisture and at the same time possessing high impact strength and good surface character, especially good surface gloss, are obtained by the process according to the invention because the depth of penetration of the UV absorber solutions during the treatment according to the invention is between about 5 μ and about 30 μ, and generally between 10 μ and 25 μ, with the dissolved UV absorber diffused into the surface layer at the same time and being fixed there as a solution in the polycarbonate, without crystallizing out on evaporation of the solvents.

This depth of penetration is sufficient to ensure that the UV absorber can no longer be removed mechanically, for example by wiping off, from the treated surfaces.

On the other hand, the fixing of UV absorbers, in the requisite concentrations in polycarbonate moldings achieved according to the invention, results in neither stress cracking occurring on the treated moldings nor a reduction of their impact strength (especially notched impact strength) being detectable.

Furthermore, surface flaws, for example in the form of blisters, are not observable on either plane or structured polycarbonate moldings.

The polycarbonate moldings, stabilized according to the invention, are thus suitable for long-term exposure to light, heat and moisture without a disadvantageous change in the mechanical and optical properties (for example the transparency to light).

The invention is further illustrated but is not intended to be limited by the following examples. In the examples the concentration of UV stabilizers in the liquid mixtures are percentages by weight of the liquid mixtures. Also, relative viscosities, which are indicative of molecular weight, are measured on a solution of 0.5 g of the polycarbonate in 100 ml of methylene chloride at 25°C.

EXAMPLE 1

An extruded sheet of polycarbonate based on 2,2-bis-(4-hydroxyphenyl)-propane, of relative viscosity 1.320 measured on a solution of 0.5 g of substance in 100 ml of methylene chloride at 25°C, the sheet being of size 300 × 300 × 4 mm, is immersed for 30 seconds in a liquid mixture of 47.5 parts by weight of isopropanol, 30.0 parts by weight of 1,2-dichloroethane and 22.5 parts by weight of water, containing 3.5 percent by weight of 2-hydroxy-4-methoxy-benzophenone in solution. After the excess solution has dripped off, the sheet is dried in air at room temperature until the bulk of the liquid has evaporated. Thereafter the remaining liquid is removed at 90°C over the course of a drying period of 20 minutes. After drying, the surface of the sheet possesses perfect high gloss and transparency.

Test specimens for carrying out aging tests and mechanical strength tests were taken from this sheet.

The test results show that after 5,000 hours' exposure to a mercury vapor high pressure lamp of type HQL 250 watt at a distance of 7 cm and at 65 percent relative atmospheric humidity, neither yellowing nor a loss in surface gloss has occurred. The notched impact strength values are unchanged and agree with those of the untreated molding.

EXAMPLE 2

A light cover with prismatic top surface and inner surface, manufactured by the injection molding process from polycarbonate based on 2,2-bis-(4-hydroxyphenyl)-propane of relative viscosity 1.282, having an internal diameter of 30 cm and a height of 15 cm, is immersed at room temperature in a mixture of 45 parts by weight of 2-chloroethanol, 50 parts by weight of 1,2-dichloroethane and 5 parts by weight of water, containing 3.5 percent by weight of 2-hydroxy-4-methoxy-benzophenone in solution. The time of immersion is 30 seconds.

After withdrawal from the immersion bath, the excess adhering solution is centrifuged off and the light cover is treated for 30 minutes at 95°C in a drying oven.

The surface of the light cover is very glossy, fault-free and transparent. It is subsequently mounted on an exterior light fitted with a 125 watt mercury vapor high pressure lamp. After 3 years of testing, this cover shows neither yellowing nor a loss in surface gloss.

EXAMPLE 3

Small bars, manufactured by the injection molding process from polycarbonate based on 2,2-bis-(4-hydroxyphenyl)-propane of relative viscosity 1.286, the size of the bars being 4 × 10 × 120 mm, are immersed at room temperature in a 3.5 percent strength solution of 2-(2'-hydroxy-5'-methylphenyl)-benzotriazole in a mixture of 50 parts by weight of ethanol, 25 parts by weight of 1,2-dichloroethane, 25 parts by weight of 1,1,2-trichloroethane for 10 seconds and after draining are treated for 30 minutes at 90°C in a drying oven.

After drying, the notched impact strength of a part of the rods is tested. It shows the same values as untreated similar moldings. Another part is artificially weathered in a Weather-Ometer for 5,000 hours. After this time neither a loss in surface gloss nor a loss in notched impact strength nor yellowing occurs. Untreated standard small rods, after the same weathering time, show a distinct yellowing, a decrease in notched impact strength and a loss in gloss.

EXAMPLE 4

A circular disc of size 50 cm is cut from an extruded sheet of polycarbonate based on 2,2-bis-(4-hydroxyphenyl)-propane, pigmented with 1.5 parts by weight of rutile, having a relative viscosity of 1.32 and a thickness of 3 mm. The disc is immersed for 30 seconds at room temperature in a 3.5 percent strength by weight solution of 2-(2'-hydroxy-3',5'-diamyl)-benzotriazole in a mixture of 45 parts by weight of isopropanol, 30 parts by weight of 1,2-dichloroethane and 10 parts by weight of water. The posttreated disc is dried for 30 seconds at 95°C.

After the disc has been warmed to 190°C by infra-red heating, it is shaped by means of compressed air into a spherical dome of radius $r = 40$ cm.

After trimming the edge, the circular dome is mounted as a cover on a round exterior light which is fitted with a 250 watt mercury vapor high pressure lamp, and is kept in operation for 3 years like a street light. After this time, the light cover shows neither yellowing nor a loss of surface gloss and of impact strength.

A cover manufactured in the same way but not post-treated shows the same notched impact strength as the post-treated cover described above. It is similarly mounted on an exterior light fitted with the same lamp and after the same operating time shows strong browning, accompanied by stress cracking and a very great loss in impact strength and surface gloss.

EXAMPLE 5

An extruded sheet of a co-polycarbonate of 4 mol percent of 4,4'-dihydroxy-3,3',5,5'-tetrabromo-diphenylpropane (tetrabromo-bisphenol A) and 96 mol percent of 2,2-bis-(4-hydroxyphenyl)-propane, of relative viscosity 1.30, the sheet being of size 500 × 500 × 4 mm, is immersed for 30 seconds into a 4 percent strength by weight solution of 2-(2'-hydroxy-5'-methylphenyl)-benzotriazole in a mixture of 47.5 parts by weight of n-propanol, 47.5 parts by weight of 1,1,2-trichloroethane and 5.0 parts by weight of water. The post-treated sheet is dried for 30 minutes at 95°C. The surface of the sheet is very glossy and transparent.

Test specimens for carrying out aging tests and tests of the mechanical strength were manufactured from this sheet. The test results show that after 2 years' tropical weathering and 5,000 hours weathering in the Weather-Ometer neither yellowing nor a loss in surface gloss has occurred. The impact strength values are unchanged. A sheet of the same type which has not been post-treated shows strong yellowing of the surface and a strong loss in gloss after these weathering tests.

EXAMPLE 6

A sheet, manufactured by the extrusion process, of polycarbonate based on 2,2-bis(4-hydroxyphenyl)-propane of relative viscosity 1.32, the sheet being of size 50 × 50 × 0.4 cm, is sprayed at room temperature with a 3.5 percent strength by weight solution of 2-(2'-hydroxy-5'-methylphenyl)-benzotriazole in a mixture of 45 parts by weight of 1,1,2-trichloroethane, 50 parts by weight of isopropanol and 5 parts by weight of water.

Spraying, so as to cover the entire surface, is carried out with 280 cm³ of solution per square meter of surface. The consumption is made up of the part of the solution which adheres to the surface, the draining loss, the loss through spraying beyond the edges and the solvent loss resulting from evaporation of the spray mist.

The sheet is dried for 30 minutes at 95°C and is subsequently exposed to tropical weathering for 2 years.

After this time, neither yellowing nor a loss in surface gloss occurs. A sheet of the same type which has not been post-treated shows a strong yellowing of the surface and a strong loss in gloss after this period of weathering.

EXAMPLE 7

A sheet, manufactured by the extrusion process, of polycarbonate based on 2,2-bis-(4-hydroxyphenyl)-propane, the sheet being of size 400 × 400 × 4 mm and the relative viscosity of the polycarbonate being 1.32, is immersed for 30 seconds in a 3.5 percent strength by weight solution of 2-hydroxy-4-methoxy-benzophenone in a mixture of 47.5 parts by weight of n-propanol, 35.0 parts by weight of 1,2-dichloroethane and 17.5 parts by weight of water and is subsequently dried for 30 minutes at 90°C.

The surface of the sheet is very glossy and free of flaws. Test specimens for carrying out mechanical strength tests and aging tests are manufactured from this sheet. The test results show that this post-treated sheet possesses the same notched impact strength as an untreated sheet manufactured in the same way.

The aging tests show that after 5,000 hours weathering in the Weather-Ometer and also after 5,000 hours exposure to a mercury vapor high pressure lamp of type HQL 250 watt from a distance of 8 cm, at 65 – 70 percent relative atmospheric humidity, no yellowing, no loss in gloss and no loss in impact strength occurs.

An untreated sheet of the same type shows strong yellowing, matting of the surfaces and a distinct drop in impact strength in the same aging tests.

COMPARATIVE EXAMPLE I a. 0.9 g of tri-iso-octyl phosphate is added to 9,000 g of granules of polycarbonate based on 2,2-bis-(4-hydroxyphenyl)-propane, of relative viscosity 1.315 measured on a solution of 0.5 g of substance in 100 ml of methylene chloride at 25°C. This amount is intimately mixed and thermoplastically converted into a ribbon in an extruder, at a melt temperature of 300°C. This ribbon is drawn off and granulated.

$a_1$. 2,000 g of the granulated material obtained under (a) are converted into test specimens on a screw injection molding machine at a melt temperature of 330°C. These test specimens are dipped for 30 seconds into a 3.5 percent strength by weight solution of 2-hydroxy-4-methoxy-benzophenone in a mixture of 47.5 parts by weight of isopropanol, 30.0 parts by weight of 1,2-dichloroethane and 22.5 parts by weight of water. After the excess solution has dripped off, the articles are dried at 90°C during a period of drying of 20 minutes.

After cooling, the test specimens show the following properties:

Notched impact strength: 45-50 kpcm/cm² — standard small bar according to (DIN 53,453)

Vicat heat distortion point: 148°–150°C (DIN 53,460 B)

Light transmission (4 mm layer thickness): 86.5 (DIN 5,036).

After 5,000 hours exposure to a mercury vapor high pressure lamp of type HQL 250 watt at a distance of 7 cm at 65 percent relative atmospheric humidity, these test specimens have not yellowed.

Light transmission (4 mm layer thickness) after exposure: 86.5. (DIN 5,036).

$a_2$. 2,000 g of the granules obtained under (a) are intimately mixed with 100 g of 2-(2'-hydroxy-5'-methylphenyl)-benzotriazole. This mixture is converted to a ribbon on an extruder at a melt temperature of 240°C. The ribbon is drawn off and granulated. The granules thus obtained are converted into test specimens on a screw injection molding machine at a melt temperature of 270°C. These specimens show the following properties:

Notched impact strength: 5-10 kpcm/cm² — standard small bar (DIN 53,453)

Vicat heat distortion point: 117°–120°C (DIN 53,460 B)

Light transmission (4 mm layer thickness): 83.5 (DIN 5,036)

After 5,000 constant exposure to a mercury vapor high pressure lamp of type HQL 250 watt at a distance of 7 cm, at 65 percent relative atmospheric humidity, these test specimens have visibly yellowed. A measure of the yellowing is the decrease in light transmission during the 5,000 hours exposure. Light transmission (4 mm layer thickness) after exposure: 79.0.

$a_3$. 2,000 g of the granular material obtained under (a) are intimately mixed with 12 g of 2-(2'-hydroxy-5'-methylphenyl)-benzotriazole and converted thermoplastically into a ribbon on an extruder at a melt temperature of 300°C. This ribbon is drawn off and granulated. The granules thus obtained are converted into test specimens on a screw injection molding machine at a melt temperature of 330°C.

These test specimens show the following properties:

Notched impact strength: 35–40 kpcm/cm² — standard small bar (DIN 53,453)

Vicat heat distortion point: 148°–150°C (DIN 53,460 B)

Light transmission (4 mm layer thickness): 85.5 (DIN 5,036)

After 5,000 hours' exposure to a mercury vapor high pressure lamp of type HQL 250 watt at a distance of 7 cm, at 65 percent relative atmospheric humidity, the test specimens show a distinct yellowing.

Light transmission (4 mm layer thickness) after exposure: 76.5.

$a_4$. 2,000 g of the granules obtained under (a) are intimately mixed with 12 g of 2-(2'-hydroxy-5'-methylphenyl)-benzotriazole, extruded and converted into test specimens, as described under ($a_3$). These test specimens are dipped for 30 seconds into a 3.5 percent strength by weight solution of 2-hydroxy-4-methoxybenzophenone in a mixture of 47.5 parts by weight of isopropanol, 30.0 parts by weight of 1,2-dichlorethane and 22.5 parts by weight of water and are dried as already described under ($a_1$).

After cooling, the test specimens have the following properties:

Notched impact strength: 35-40 kpcm/cm$^2$ — standard small bar (DIN 53,453)

Vicat heat distortion point: 148°–150°C (DIN 53,460 B)

Light transmission (4 mm layer thickness) 85.5 (DIN 5,036)

These test specimens do not yellow during 5,000 hours' exposure to a mercury vapor high pressure lamp of type HQL 250 watt at a distance of 7 cm, at 65 percent relative atmospheric humidity. Light transmission (4 mm layer thickness) after exposure: 85.5.

This example illustrates the improved properties of polycarbonates treated according to the process of the invention ($a_1$) compared to the properties of polycarbonates stabilized according to U.S. Pat. No. 3,322,719 ($a_2$). Additionally, a comparison of the results of ($a_3$) and ($a_4$) illustrates that the process of the invention may be used with polycarbonates already stabilized with other UV absorbers, such as polycarbonates stabilized according to U.S. Pat. No. 3,322,719 ($a_3$) with a resulting improvement in properties ($a_4$).

COMPARATIVE EXAMPLE II

Small bars manufactured by the injection molding process from polycarbonate based on 2,2-bis-(4-hydroxyphenyl)-propane, of relative viscosity 1.279 measured on a solution of 0.5 g of substance in 100 ml of methylene chloride at 25°C, the rods being of size 4 × 10 × 120 mm, are dipped at room temperature either a. for 30 seconds in a 3.5 percent strength by weight solution of 2-(2'-hydroxy-3',5'-di-tert.-butylphenyl)-benzotriazole in a mixture of 1 part by weight of 1,2-dichloropropane and 10 parts by weight of benzene, or b. for 30 seconds in a 3.5 percent strength by weight solution of 2-(2'-hydroxy-3',5'-di-tert.-butylphenyl)-benzotriazole in a mixture of 60 parts by weight of 1,2-dichloroethane and 40 parts by weight of 1,1,2,2-tetrachlorodifluoro-ethane, or c. for 30 seconds in a 2.5 percent strength by weight solution of 2-(2'-hydroxy-3',5'-di-tert.-butylphenyl)-benzotriazole in a mixture of 47.5 parts by weight of isopropanol, 30.0 parts by weight of 1,2-dichloroethane and 22.5 parts by weight of water.

The excess solution is in each case allowed to drip off and the test specimens are thereafter dried, the test specimens treated according to IIa and IIb being dried at a temperature of 70°C which is gradually raised to 130°C and kept at 130°C for 30 minutes, and the test specimens treated according to IIc being dried for 20 minutes at 90°C.

After cooling to room temperature, the test specimens stabilized according to IIa and IIb in each case have a notched impact strength of 2.5 to 3.5 kpcm/cm$^2$ and the test specimens stabilized according to IIc have a notched impact strength of 35–50 kpcm/cm$^2$, in each case measured according to DIN 53,453. IIa and IIb are illustrative of the process for stabilizing polycarbonate according to U.S. Pat. No. 3,617,330.

While the invention has been described in conjunction with specific embodiments thereof, it is not intended to be limited to those embodiments, but on the contrary, is intended to embrace all alternatives, modifications and variations as fall within the spirit and scope of the appended claims.

What is claimed is:

1. In the process for the production of moldings of high molecular weight thermoplastic polycarbonates of bivalent phenols having dispersed to a depth of from about 5 to about 30 μ from the surface, from about 2 to about 30 grams per square meter of surface of an ultraviolet absorber, the surface being sealed, wherein 150 to 300 cc/(m$^2$ of molding surface) of a stabilizer solution are applied to the molding surface and the molding surface thereafter dried, the improvement comprising employing as the stabilizer solution a solution comprising a. a liquid mixture comprising 10 – 80 parts by weight of an aliphatic $C_1$ –$C_3$ halogenohydrocarbon; 20 – 80 parts by weight of a lower aliphatic $C_1$ – $C_4$ alcohol and 0 – 25 parts by weight of water, and b. 2 – 20 parts by weight based on the weight of the liquid mixture, of an ultraviolet absorber for polycarbonates selected from the group consisting of benzophenone derivatives, benzotriazole derivatives, crotonic acid esters, acrylic acid esters and mixtures of these ultraviolet absorbers.

2. The process of claim 1 wherein the stabilizer solution is applied to the molding surface of the polycarbonate by dipping the moldings into the stabilizer solution for 5 to about 60 seconds and allowing excess solution to drip off prior to drying.

3. The process of claim 1 wherein the halogenohydrocarbon is a chlorohydrocarbon.

4. The process of claim 1 wherein the ultraviolet absorber is selected from the group consisting of benzophenone derivatives, benzotriazole derivatives and mixtures of these ultraviolet absorbers.

5. The process of claim 4 wherein the benzophenone derivatives have the formula

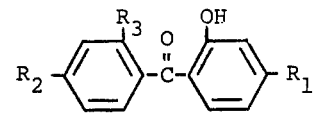

wherein
$R_1$ is —H, —OH, —O—$CH_3$ or —O—$(CH_2)_7$—$CH_3$,
$R_2$ is —H, —O—$CH_3$ or $CH_3$, and
$R_3$ is —H or —OH
and the benzotriazole derivatives have the formula

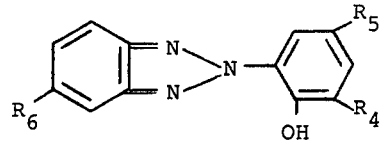

wherein
R$_4$ is —H, —CH$_3$, —C(CH$_3$)$_3$ or —(CH$_2$)$_4$—CH$_3$,
R$_5$ is —H, —CH$_3$, —C(CH$_3$)$_3$—(CH$_2$)$_4$—CH$_3$ or cyclohexyl, and
R$_6$ is —H or —Cl.

6. The process of claim 5 wherein the halogenohydrocarbon is a chlorohydrocarbon.

7. The process of claim 6 wherein the chloro hydrocarbons are selected from the group consisting of dichloromethane, trichloromethane, 1,2-dichloroethane, 1,2-dichloropropane, 1,1,2-trichloroethane and mixtures of these chlorohydrocarbons.

8. The process of claim 7 wherein the moldings are immersed in the stabilizer solution for a period of 5 to 60 seconds and thereafter dried at a temperature of 70° to 100°C.

9. The process of claim 7 wherein the stabilizer solution is applied to the surface of the molding and the molding is thereafter dried at a temperature of 70° to 100°C.

10. The process of claim 7 wherein the liquid mixture comprises 30 to 50 parts by weight of a chloro hydrocarbon selected from the group consisting of 1,2-dichloroethane and 1,1,2-trichloroethane, 45 to 50 parts by weight of a lower aliphatic C$_1$ to C$_4$ alcohol, and 0 to 22.5 parts by weight of water and wherein the ultraviolet absorber is 2.5 to 4.0 percent by weight based on the weight of the liquid mixture of an absorber selected from the group consisting of 2-hydroxy-4-methoxy benzophenone, 2-(2'-hydroxy-5'-methylphenyl)benzotriazole, 2-(2'-hydroxy-3',5'-diamyl)benzotriazole and 2-(2'-hydroxy-3',5'-ditertiary butylphenyl)benzotriazole.

11. A process for the stabilization of moldings of high molecular weight polycarbonates against simultaneous exposure to UV irradiation, heat and moisture comprising applying to the surface of the moldings 150 – 300 cc/m$^2$ (of molding surface) of a solution comprising
 a. a liquid mixture comprising 10 – 80 parts by weight of an aliphatic C$_1$ – C$_3$ halogenohydrocarbon; 20 – 80 parts by weight of a lower aliphatic c$^1$ – C$_4$ alcohol and 0 – 25 parts by weight of water, and
 b. 2 – 20 parts by weight, based on the weight of the liquid mixture, of an ultraviolet absorber for polycarbonates, and thereafter drying the moldings at a temperature of between 70° – 100°C.

12. A process for the stabilization of moldings of high molecular weight polycarbonates against simultaneous exposure to UV irradiation, heat and moisture comprising immersing the moldings of the polycarbonate for a period of from 5 to 60 seconds in a stabilizer solution comprising
 a. a liquid mixture comprising 10 – 80 parts by weight of an aliphatic C$_1$ – C$_3$ halogenohydrocarbon; 20 – 80 parts by weight of a lower aliphatic C$_1$ – C$_4$ alcohol and 0 – 25 parts by weight of water, and
 b. 2 – 20 parts by weight, based on the weight of the liquid mixture, of an ultraviolet absorber for polycarbonates, and thereafter drying the moldings at a temperature of from 70° to 100°C.

13. The process of claim 12 wherein the moldings are dried at a temperature of from 90° – 95°C.

* * * * *